April 1, 1924.
J. N. GAUDREAU
1,489,202
APPLIANCE FOR HOLDING A COW'S TAIL
Filed Feb. 6, 1922
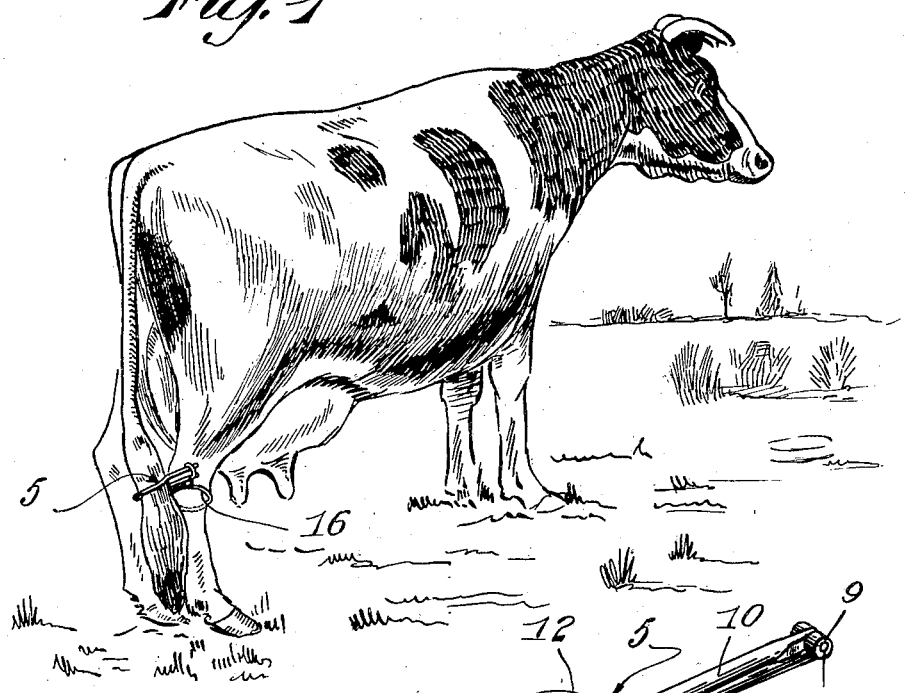
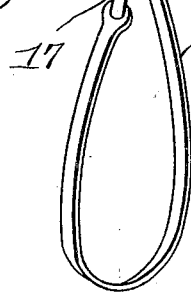
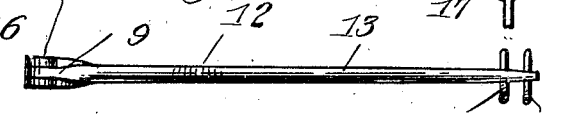
Inventor
Joseph N. Gaudreau
By William C Sinton
Attorney Patented Apr. 1, 1924.

1,489,202

UNITED STATES PATENT OFFICE.

JOSEPH N. GAUDREAU, OF ELROSE, SASKATCHEWAN, CANADA.

APPLIANCE FOR HOLDING A COW'S TAIL.

Application filed February 6, 1922. Serial No. 534,607.

*To all whom it may concern:*

Be it known that I, JOSEPH N. GAUDREAU, a subject of the King of Great Britain, residing at Elrose, Province of Saskatchewan, Canada, have invented certain new and useful Improvements in Appliances for Holding a Cow's Tail; and I do hereby declare that the following is a full, clear, and exact description of the invention, such as will enable others skilled in the art to which it appertains to make and use the same.

The present invention relates to new and useful improvements in appliances for holding the tail of a cow or the like and preventing movement thereof while the said cow is being milked.

Another object of the invention is the provision of a device for securing the tail of a cow to one of the hind legs to prevent the said cow from switching its tail into the milk pail or face of the milker during the milking operation.

Another object of the invention is the provision of a device such as above referred to, which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed, and illustrated in the accompanying drawing, forming a part of the present application, and in which:

Figure 1 is a perspective view showing the invention applied;

Figure 2 is a similar view on an enlarged scale, showing the invention removed;

Figure 3 is a side elevation thereof; and,

Figure 4 is a plan view.

Referring now to the accompanying drawing by corresponding characters of reference throughout the several views, the numeral 5 designates in general an improved device, which consists of a straight bar 6 having a pair of spaced openings 7 and 8 formed in one end thereof and a pair of ears 9 provided at the opposite end thereof, and between which a locking bar 10 is pivoted, as shown at 11. The bar 10 is offset as at 12 in slightly spaced relation to its pivoted end, and then extends parallel as at 13 to the bar 6 in spaced relation thereto, the same being gradually tapered towards its free end. A pair of rings 14 and 15 are engaged in the openings 7 and 8 respectively, and to the ring 15 a strap 16 is secured and is designed to pass around one of the hind legs of a cow to which the device is secured by means of the clasp 17.

The brush of the tail is then passed under the locking member 13 of the device which is held in position against displacement by means of the ring 14.

When in this position, the cow is prevented from switching her tail into the milk container or against the face or hands of the milker.

From the foregoing description taken in connection with the accompanying drawing, it will be manifest that an appliance for holding a cow's tail against undesired movement is provided, which will fulfil all of the necessary requirements of such a device, and it should be understood in this connection that various minor changes in the specific details of construction can be resorted to within the scope of the appended claim, without departing from the spirit or sacrificing any of the advantages of the invention.

Having thus fully described the invention, what I claim as new and desire to protect by Letters Patent is:—

A tail holder comprising a straight bar having a pair of rings passed through one end thereof, a second bar hinged to the remaining end of the first named bar and having an offset portion receivable in one of said rings, a strap connected to the remaining ring and having its free end provided with a clasp adapted for engagement with said last named ring.

In witness whereof I have hereunto set my hand.

JOSEPH N. GAUDREAU.